United States Patent
Hamma et al.

[11] 3,805,676
[45] Apr. 23, 1974

[54] PRESSURE CONTROL SYSTEM

[75] Inventors: Karlmann Hamma, Tettnang; Horst Baurle, Stuttgart, both of Germany

[73] Assignee: Zahnradfabrik Friedrichshafen Aktiengesellschaft, Postfach, Germany

[22] Filed: Jan. 13, 1972

[21] Appl. No.: 217,444

[30] Foreign Application Priority Data
Jan. 23, 1971  Germany............................ 2103095

[52] U.S. Cl........................... 91/506, 74/843, 74/865
[51] Int. Cl................................................. F01b 3/00
[58] Field of Search......... 91/506; 74/843, 845, 865

[56]  References Cited
UNITED STATES PATENTS

| | | | |
|---|---|---|---|
| 3,256,747 | 6/1966 | Kempson | 74/865 |
| 3,308,678 | 3/1967 | Walker | 74/843 |
| 3,292,449 | 12/1966 | Lewis et al. | 74/865 |
| 3,426,624 | 2/1969 | Karig et al. | 74/846 |

*Primary Examiner*—C. J. Husar

[57] ABSTRACT

A slow or "creep" speed arrangement is provided for systems having an internal combustion engine to drive a pump which in turn drives a hydraulic motor. Such systems are used for operation of a vehicle of the kind having a power take-off, usually farm vehicles. Thus, a combined control, e.g., speed control of a diesel engine and the rate of pump discharge, is effected by means of the engine fuel pedal and a "creep" pedal or other manually operable element, via a linkage coupled to the fuel pedal linkage in such a manner that the engine may operate at a high power rate even though the drive pump discharge is low for creep speeds of the hydraulic drive motor. This effects sufficient power for the take-off connection which otherwise might not be sufficiently powered when the vehicle is being propelled at low engine speed for slow travel. The system inherently reduces engine speed when there is no power demand, and other effects and advantages will be apparent from the detailed disclosure. However, it should be noted that the pedals can be operated independently in any sequence to get any combination of engine power and pump output which may be required for any particular situation. Further, the creep pedal can also be used to actuate a brake for a vehicle.

9 Claims, 5 Drawing Figures

PRESSURE CONTROL SYSTEM

The invention provides a novel and simple system which makes it possible to utilize full power of an engine while at the same time reducing the pump discharge rate to a minimum. This is a very useful function where it is necessary for slow or so-called "creep" travel of the vehicle in which the installation is made or for operation of take-off power for a winch, or the like.

Previous arrangements for achieving a creep effect in hydrostatic drive systems have heretofore had certain drawbacks which are overcome by the present invention. For example, in one system either the pump or the hydraulic motor, or both, are coupled with engine speed control elements and in normal starting and driving range of the engine and the pump the power transfer is satisfactory. However, in creep speeds there is insufficient transfer of engine power for operation of power take-offs. Various expedients to overcome this problem have been used such as uncoupling the engine speed and pump control arrangement, or overriding the coupling. In such arrangements, however, where uncoupling takes place when the vehicle or take-off apparatus is stopped, the engine continues to run at the speed for which it had been set when delivering power. This effects annoyance due to the considerable noise, particularly in the case of diesel engines, in addition to waste of fuel.

The above problem has been met by means of an arrangement such that the speed of the engine at a required rate for sufficient power is available only at creep speeds of the vehicle, i.e., low discharge rate of the drive pump. Arrangements as described take the form of an automatic resetting of the engine to idling in response to low pump discharge rate. However, such systems and arrangements are relatively complex as compared with the simple system disclosed herein.

By way of further background, another system is known which effects a coupling between the hydrostatic drive and the control of engine speed wherein pump discharge rate increases with engine speed. However, for creep speeds at high engine power some portion of the pump output is bypassed to a sump. This is disadvantageous because of the unnecessary waste of power as well as the considerable rise in the hydrostatic system oil temperature, and a large oil cooling system is required.

The present invention avoids the drawbacks of prior systems by the simple expedient of providing a linkage means attached to and controlled by the fuel control pedal which linkage means controls the angularity of the pump drive plates, for example, in the case of a swash plate pump, or controls other elements which vary discharge rate of other types of pumps.

The linkage means in the present invention is adjustable so that its mechanical motion in certain modifications herein disclosed can be varied by varying the length of a link in the linkage means. In other words, the range of actuatable motion can be predetermined so as to predetermine the range of pump discharge rate variation. Thus, a reduced linkage means motion effects a reduced upper limit of pump discharged rate, i.e., a reduced range of discharge rate.

The link which can be controlled as to its length has a piston and cylinder arrangement incorporated in it, and a pressure source is utilized under control of a manually operable member, e.g., a creep pedal to pressurize the cylinder for reducing the length of the link and thus the range of actuatable motion of the linkage means. Several modifications are along the lines of linkage means motion reduction as just described, however, one modification herein operates solely by a system of valving utilizing a multi-position cylinder.

It has been found that the application of the invention can result in power output from the engine for take-off power up to 80 percent higher as compared with previously used systems. Further, there are no power losses nor oil cooling problems, which are drawbacks attendant previous systems.

Inherent in the present system and its use of a creep pedal which for any setting predetermines the discharge rate range of the engine driven pump is the fact that brake rod mechanism can be connected to the creep pedal which mechanism becomes operative after the creep pedal has been given predetermined depression. Thus, the brake is applied at little or no discharge of pump output. Preferably some mechanical resilient detent, or the like, would be arranged in conjunction with the creep pedal to be overcome by the pressure of the operator's foot so that he would be apprised of the fact that the brake was being applied and would not unwittingly apply it when it was not desired to do so.

In retrospect, the invention permits full control of engine power independent of pump discharge rate, such that any combination of engine power output and discharge rate can be achieved in balance, that is, the effecting of an equilibrium condition, for meeeting any particular problem of travel speed or take-off requirement. In connection with the use of the system for braking purposes, the creep pedal can likewise be used for slowing or braking prior to actual final movement for motivating a mechanical brake system. However, in various applications a separate and independent brake pedal may also be utilized.

A detailed description of the invention now follows in conjunction with the appended drawing in which:

FIG. 1 discloses diagrammatically a control system in a closed circuit utilizing a variable throttle to meter pressure fluid for control purposes, including a brake system incorporated into the combination;

Figure 1:
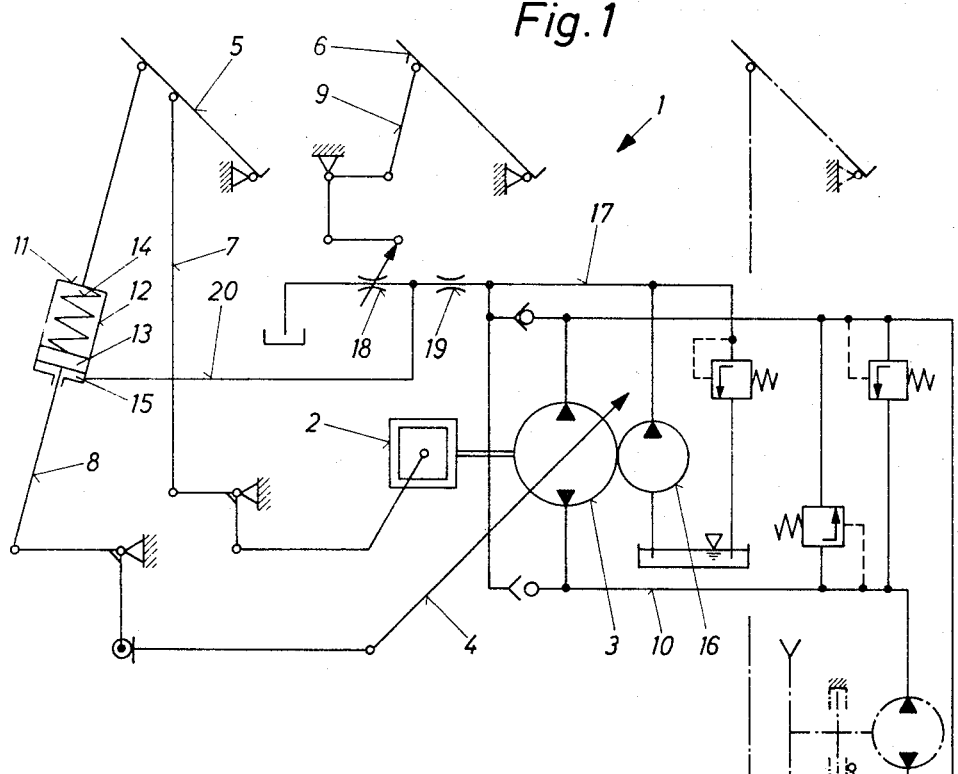

Referring to FIG. 1, the diagram is illustrative of a system 1 utilizing an internal combustion engine 2 for example, a Diesel engine, wherein a linkage 7 connected to a fuel pedal 5 can effect throttling control of the engine in the usual manner. The hydrostatic transmission pump 3 is driven by the engine and it will be understood connects to a hydraulic motor (not shown) for any installation, for example, a farm vehicle or tractor. Pump 3 is of the usual conventional reversible kind, being a variable displacement type wherein the output is responsive to a controllable stroke variation effected by a linkage means 4. The linkage means 4 is connected to fuel pedal 5 through a variable length link 8 which comprises a piston rod secured to a piston 13 in a cylinder 12, all incorporated in the link 8 that the position of the piston in the cylinder determines the length of link 8. Piston 13 is biased by a spring 14 toward the bottom of the cylinder whereat the cylinder chamber 15 below the piston is reduced to a minimum or to zero volume. Thus, the linkage 4 is a means for effecting pump displacement variation range depending on the length of link 8 when fuel pedal 5 is depressed.

Depression of fuel pedal 5 will speed up the engine via linkage means 7 and increase pump output by operation of linkage means 4, linkages 4 and 7 acting together. However, for certain needs, it is desirable to increase engine speed for power without a corresponding increase in pump output, i.e., maintaining the displacement increase range at a reduced rate. In order to effect this, a manually operable control lever or member 6 is provided which in the present instance is shown as a foot pedal similar to fuel pedal 5 and hereinafter termed the creep pedal.

The creep pedal 6 acting through linkage means 9 controls pressure fluid from an auxiliary pump 16 through flow line 17, fixed throttle 19, and variable throttle 18 to a sump, with a flow line 20 connected intermedially the throttles to the cylinder chamber 15.

By depressing the creep pedal 6 the pressure in line 17 from pump 16 is fed to cylinder chamber 15 in degree responsive to the degree of depression of the pedal 6. Thus depressing that pedal closes down the throttle 18 whence greater pressure is built up in line 20 to force piston 13 upwardly in cylinder 12 against the bias of spring 14. The fixed throttle 19 prevents dropping of pressure in line 17 when throttle 18 is fully open and also prevents too rapid return of pressure fluid from cylinder 15.

The pressure in chamber 15 effectively shortens the connecting link 8 in which it is incorporated, thus reducing the extent of the actuatatable range that linkage 4 can be actuated by fuel pedal 5. Accordingly, when fuel pedal 5 is depressed, engine 2 speeds up but there is a shortened motion of linkage 4 to vary the discharge of pump 3 within a reduced rate range. Therefore, it is possible to produce more engine power output for diminished pump output in order to meet particular requirements of the vehicle such as slow travel or take-off power. It will be apparent that the greater the depression of creep pedal 6 acting through its linkage 9 on a variable throttle 18 the shorter the link 8 connection becomes and the greater the linkage range reduction of motion. Thus, it is possible to have full throttle of the engine with low pump output if so desired.

Incorporated within the same closed circuit system is a hydraulic motor M and a brake system as indicated in phantom lines including a brake pedal and cylinder acting on a brake drum connected to the vehicle wheel.

Figure 2:
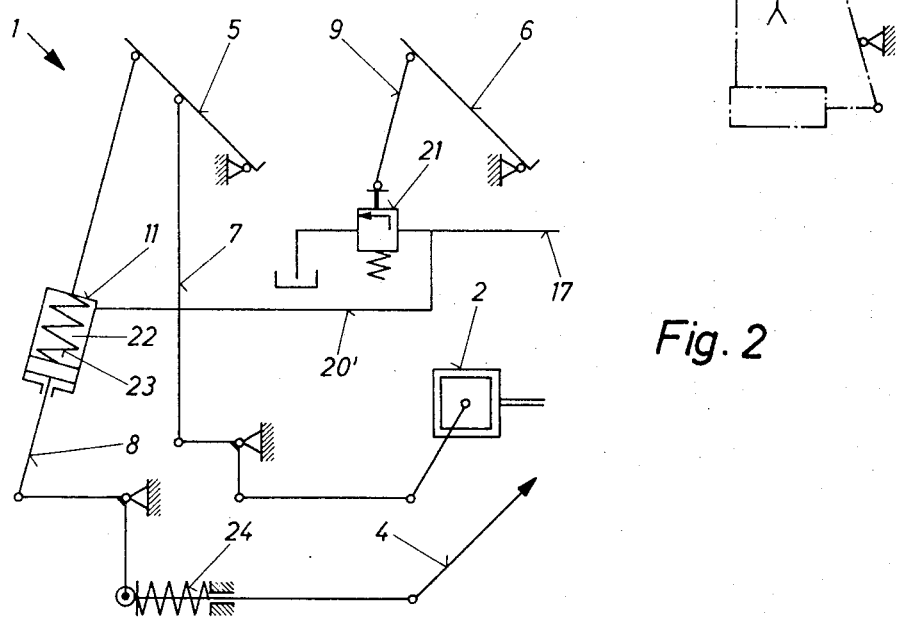
FIG. 2 shows a portion of a modified system utilizing a pressure regulating valve control.

In the modification shown in FIG. 2, the adjustable throttle 18 of FIG. 1 is eliminated in favor of a pressure regulating valve 21 controlling pressure in the pressure line 20' corresponding to the line 20 of FIG. 1. Creep pedal 6, via linkage 9, varies the regulating valve 21 to control flow to the upper portion of chamber 22 of the piston-cylinder portion of link 8.

In this instance, a tension spring 23 pulls the piston upwardly but pressure in chamber 22 via line 20' forces the piston downwardly. Spring 24 on the linkage means 4 which varies pump displacement as in FIG. 1, is a compression spring and biases pedal 5 to upper position.

There is continuous pressure in the line 20' to maintain the piston at the bottom of the cylinder against the tension of spring 23, but when pedal 6 is depressed, pressure is bypassed through valve 21 to the sump, permitting spring 23 to pull the piston upwardly. This shortens the link 8 and reduces the actuatable motion range of linkage means 4 as effected by pedal 5 to a selective discharge rate range determined by the setting of pedal 6.

Such setting depends upon the degree of depression of pedal 6. When pedal 5 is depressed, the engine is speeded up and depending upon the selective degree of depression of pedal 6 the discharge rate range is predtermined, all as obtained in the modification of FIG 1.

The tension spring 23 also serves the purpose of equalizing leakage losses particularly in starting up the system for operation.

Figure 3:
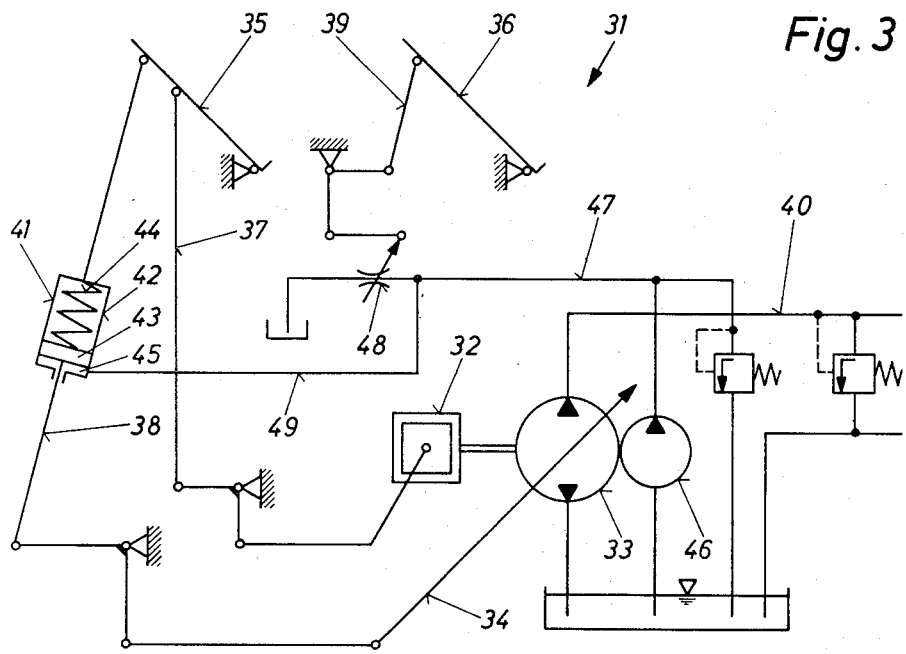
FIGS. 3 and 4 show open circuit systems with throttle and pressure regulating valve adjustment, respectively.
Figure 4:
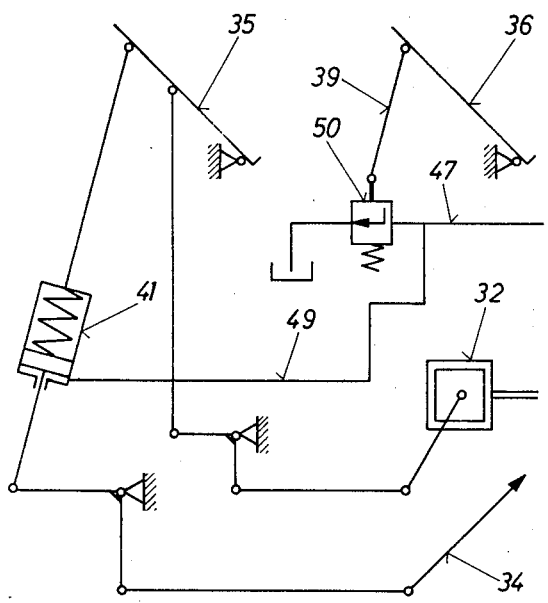

In the form of the invention shown in FIGS. 3 and 4 the control system 31 is shown for an open circuit system 40 in many ways similar to the system shown in FIG. 1. Thus, the discharge rate range varying mechanism has the linkage means 34 for pump 33 displacement control, wherein the pump is driven by engine 32. The fuel pedal 35 acts through variable length link 38 and has a connection to linkage means 34 via link 38. Link 38 is maintained at fixed length by the incorporated piston-cylinder combination 41 comprising cylinder 42, piston 43, spring 44. A cylinder chamber 45 connects to line 49 for pressure. In this case spring 44 is a compression spring to maintain chamber 45 at minimum or zero volume.

Fuel pedal 35 also actuates linkage means 37 for speed and power variation of engine 32.

Creep pedal 36 controls via linkage means 39 a variable throttle valve 48 whereby pressure in line 47 from auxiliary pump 46 is fed via line 49 to chamber 45, all being in reference to FIG. 3. However, in FIG. 4, a pressure regulating valve 50 has been substituted for the variable throttle 48 of FIG. 3, thus simplifying the linkage system 39' of FIG. 4 as compared with linkage system 39 of FIG. 3.

In either modification the building up of pressure in chamber 45 reduces the displacement range of pump 33 upon depressing creep pedal 36. This reduction is counteracted when fuel pedal 35 is depressed but obviously the range through which pump displacement can be controlled by the fuel pedal has been reduced to a lower displacement range depending upon the degree of depression of creep pedal 36. Accordingly, as in the other modifications herein, full power engine output can be achieved with very slow travel of the vehicle or slow operation of a take-off.

As shown in FIG. 3, a brake rod mechanism R is disposed to be actuated by pedal 36 at the lower portion of movement of the pedal, corresponding to a minimum discharge rate range.

Figure 5:
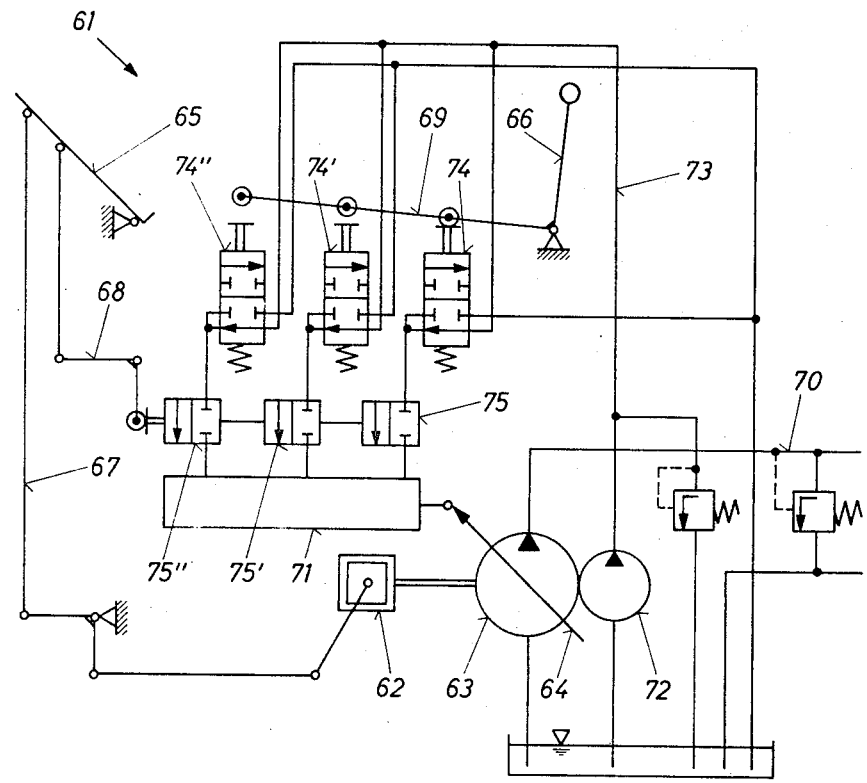
FIG. 5 illustrates a system differing from the previous systems in that a hydraulic cylinder is utilized directly for effecting the pump output variation, in an open cycle system.

Referring now to FIG. 5, the system 61 utilizes a multi-position pressure operable cylinder 71 for varying displacement of pump 63 via the displacement varying mechanism 64 in an open circuit system 70.

Pump 63 is driven by engine 62 wherein a fuel pedal 65 controls the throttle via linkage means 67. In this instance the pump displacement range is controlled by a manual operable bell crank lever 66, rather than a pedal, wherein the lever upon being swung counterclockwise, as viewed on FIG. 5, can, by means of its arm 69 control in sequential order the multivalves 74, 74' and 74''. The valves are thus operated in the order named to control pressure from auxiliary pump 72 via line 73 to the open or closed valves 75, 75' and 75'' which are controlled via linkage means 68 connected to fuel pedal 65.

In the position shown in FIG. 5, pump 63 and the displacement control mechanism are set for maximum output of discharge rate. However, if the creep lever 66 is swung counterclockwise, valve 74 is conditioned to exhaust a portion of cylinder 71 when fuel pedal 65 is depressed. Accordingly displacement is decreased although engine 62 is speeded up. Two successive steps of decreased displacement are likewise provided upon operation of valves 74' and 74'' by the lever 66. Similarly, depression of all valves 74, 74', 74'' will effect minimum discharge rate when all chambers of cylinder 71 are exhausted via valves 75, 75' and 75'' when the fuel pedal is initially depressed.

Thus, if lever 66 is not shifted, depressing pedal 65 will effect high pressure to all portions of cylinder 71 for providing the highest range of pump displacement via initial shifting of valves 75, 75', 75'', such pressure being from pump 72 to the respective valves 74, 74', 74''. However, shifting of lever 66 produces reverse flow from the cylinder portions to the sump upon depressing pedal 65 and by shifting, selectively, 74 or 74 and 74' or 74, 74' and 74'' three progressively reduced ranges of pump displacement are effected.

In retrospect it will be noted that the forms of the invention shown in FIGS. 1–4 contemplate the hydrostatic pump being at a position for minimum discharge rate when the fuel pedal is in uppermost position. Regardless of the mode of shortening of the link which connects to the fuel pedal, the effect on the linkage means is to shorten its movable range for full movement of the fuel pedal. Where the cylinder of the adjustable length link has not been pressurized, then the fuel pedal can provide a full discharge rate range for the pump. Otherwise, due to the reduction of the degree of motion of the linkage at a selective setting of the creep pedal, the variable range of discharge rate controllable by the fuel pedal can be predetermined from minimum discharge up to a limit determined by the creep pedal setting. In FIGS. 1, 3 and 4, the spring in the cylinder of the variable length link is the return spring for the fuel pedal. However, since a tension spring 23 is used within cylinder of FIG. 2, a compression spring 24 is required for fuel pedal return.

FIG. 5 differs essentially from the preceding modifications in that the pump is initially in a position for maximum discharge rate. However, the preconditioning of the pump adjustment 64 via the valving system as effected by the creep lever 66 comes into play immediately upon the fuel pedal 65 being depressed to swing the adjustment mechanism 64 from maximum discharge rate reducedly to an upper limit of a range of discharge rate provided for by the selected setting of the creep lever.

It will be appreciated that various changes in linkage means may be made or in valving systems. However, the spirit of the invention wherein a predetermined range of discharge rate can be effected is the feature of primary importance to be protected herein. Likewise of importance are the simple arrangements using valves, variable throttles, and pressure regulators for creep control.

It will be appreciated by persons skilled in the art that the various size of throttles and valves are selected in order to achieve a quick response to any setting of the creep pedal, in other words, the throttling effect must not be too restrictive. Also, throttling in the hydrostatic drive system can be utilized where required to prevent overspeeding of the hydraulic drive motor due to a high rate of return flow under various use conditions.

What is claimed is:

1. A control system for a hydrostatic motor installation of the kind which comprises an internal combustion engine and a hydrostatic pump-motor combination driven thereby, which system comprises a fuel pedal and linkage means actuatable thereby to control fuel flow to an engine, and said pedal having additional linkage means actuatable thereby to simultaneously control pump discharge rate; an adjusting mechanism in said latter linkage means to vary the actuatable range thereof so as to predetermine the range of discharge rate controllable by said pedal; said additional linkage means comprising a manual independently operable member to selectively predetermine the extent of effective movement of said additional linkage during the course of operation of said fuel pedal to effect engine power increase while effecting control of pump discharge rate in a range predetermined by said manually operable member.

2. A control system as set forth in claim 1, said additional linkage means comprising a device having means for effecting a predetermined degree of actuatable motion responsive to a setting of said manually operable member to reduce the discharge rate range upon actuation of said additional linkage means by said fuel pedal so as to effect increase of engine power output within a reduced range of pump discharge rate.

3. A control system as set forth in claim 2, said device comprising a link of adjustable length in said additional linkage means.

4. A control system as set forth in claim 3, including means for effecting adjustability of said link length comprising a cylinder and piston as portions of said link and means biasing said piston toward one end of said cylinder; pressure means, and flow control means therefor connected to said cylinder and operable by said manually operable member to shift said piston in said cylinder to an extent determined by extent of operation of said manually operable member to selectively vary the length of said link.

5. A control system as set forth in claim 4, said flow control means comprising a variable throttle.

6. A control system as set forth in claim 4, said flow control means comprising a variable pressure regulator.

7. A pump discharge rate control system for a hydrostatic transmission of the kind comprising an internal combustion engine and a variable displacement pump driven thereby; and a hydrostatic motor; said system comprising engine control means for controlling the speed of said engine; a discharge rate varying mechanism for said pump actuatable by said engine control means and comprising a manually operable member and further comprising means responsive to operation of said manually operable member to a selected manual setting for predetermining the actuatable extent of said mechanism by said engine control means simultaneously with control of engine speed; whereby engine speed may be varied from minimum to maximum while pump discharge rate is varied within limits predetermined by the setting of said manually operable member.

8. A pump discharge rate control system as set forth in claim 7, said discharge rate varying mechanism comprising a multiposition cylinder means connected to effect a different range of discharge rate for each position of the cylinder means; and further comprising valve means actuatable by said manually operable member to selectively condition said cylinder means for positioning, and also including valve means actuatable by said engine control means to control flow through said first mentioned valve means to effect cylinder means position, and a pressure source connected to feed to said first mentioned valve means and thence through said second mentioned valve means to said cylinder means.

9. A pump discharge rate control system as set forth in claim 7, said manually operable member being a pedal, and a brake mechanism disposed to be operated by said pedal to actuate a brake upon said pedal being depressed beyond a predetermined point into the lowest range of pump discharge rate.

* * * * *